US011314255B2

(12) United States Patent
Cho

(10) Patent No.: US 11,314,255 B2
(45) Date of Patent: Apr. 26, 2022

(54) INTELLIGENT CLEANING ROBOT

(71) Applicant: TRIPLE WIN TECHNOLOGY(SHENZHEN) CO.LTD., Shenzhen (CN)

(72) Inventor: Yu-An Cho, New Taipei (TW)

(73) Assignee: TRIPLE WIN TECHNOLOGY(SHENZHEN) CO.LTD., Shenzhen (CN)

(*) Notice: Subject to any disclaimer, the term of this patent is extended or adjusted under 35 U.S.C. 154(b) by 371 days.

(21) Appl. No.: 16/657,373

(22) Filed: Oct. 18, 2019

(65) Prior Publication Data
US 2021/0041876 A1 Feb. 11, 2021

(30) Foreign Application Priority Data

Aug. 7, 2019 (CN) .......................... 201910727520.5

(51) Int. Cl.
*B63B 35/32* (2006.01)
*G05D 1/02* (2020.01)
(Continued)

(52) U.S. Cl.
CPC .......... *G05D 1/0206* (2013.01); *A47L 9/2826* (2013.01); *A47L 9/30* (2013.01);
(Continued)

(58) Field of Classification Search
CPC .... B25J 11/0085; B25J 19/021; B25J 9/0087; G05D 1/0242; G05D 1/0206;
(Continued)

(56) References Cited

U.S. PATENT DOCUMENTS

| 2010/0204841 A1* | 8/2010 | Chemel | H05B 45/20 |
| | | | 700/282 |
| 2013/0331990 A1* | 12/2013 | Jeong | A47L 11/4061 |
| | | | 700/259 |
| 2018/0055325 A1* | 3/2018 | Yoon | G01S 17/88 |

FOREIGN PATENT DOCUMENTS

| CN | 206659754 U | 11/2017 |
| CN | 208409891 U | 1/2019 |

(Continued)

OTHER PUBLICATIONS

Lee et al., A real-time 3D IR camera based on hierarchical orthogonal coding, 2006, IEEE, p. 2035-2040 (Year: 2006).*

(Continued)

*Primary Examiner* — McDieunel Marc
(74) *Attorney, Agent, or Firm* — ScienBiziP, P.C.

(57) ABSTRACT

An intelligent cleaning robot comprises a housing, an optical module, a pickup module, a central processing module, and a drive module. The housing defines light transmission holes for the optical module, which comprise an infrared light source, a complex light source, a structure light lens to receive reflected infrared light through the holes to form a three-dimensional image, and a color lens to receive reflected light through the holes to form a color image. The central processing module can receive the three-dimensional image and the color image and form an image of an environment. The pickup module can be controlled to pick up garbage and objects in the environment according to the image of an environment, and the robot can be controlled to move on land or in water.

10 Claims, 8 Drawing Sheets

(51) Int. Cl.
*H04N 13/254* (2018.01)
*H04N 9/04* (2006.01)
*A47L 9/28* (2006.01)
*A47L 9/30* (2006.01)
*B60L 8/00* (2006.01)
*A47L 11/40* (2006.01)

(52) U.S. Cl.
CPC ........... *A47L 11/4011* (2013.01); *B60L 8/003* (2013.01); *B63B 35/32* (2013.01); *G05D 1/0242* (2013.01); *H04N 9/04* (2013.01); *H04N 13/254* (2018.05); *A47L 2201/00* (2013.01); *G05D 2201/0203* (2013.01)

(58) Field of Classification Search
CPC ......... G05D 1/0692; G05D 2201/0203; G05D 1/0248; B63B 35/32; B60L 8/003; B60L 2200/40; B60L 2260/32; A47L 9/009; A47L 9/2826; A47L 9/30; A47L 11/4011; A47L 2201/00; H04N 13/254; H04N 9/04; H04N 13/128; H04N 2013/0081; Y02T 10/7072

See application file for complete search history.

(56) References Cited

FOREIGN PATENT DOCUMENTS

| | | | | |
|---|---|---|---|---|
| EP | 2631730 | * | 8/2013 | .......... A47L 11/4061 |
| TW | 201826993 A | | 8/2018 | |

OTHER PUBLICATIONS

Sert et al., Laser Assisted Intelligent Guidance For Automated Guided Vehicles, 1993, IEEE, p. 201-206 (Year: 1993).*

Fryc et al., An automated system for evaluation of the quality of light sources, 2016, IEEE, pg. (Year: 2016).*

Franzius et al., Embedded Robust Visual Obstacle Detection on Autonomous Lawn Mowers, 2017, IEEE, pg. (Year: 2017).*

* cited by examiner

INTELLIGENT CLEANING ROBOT

FIELD

The subject matter herein generally relates to an intelligent cleaning robot.

BACKGROUND

A cleaning robot is a mobile machine which picks up trash and objects while moving automatically in a space such as a house or an office.

BRIEF DESCRIPTION OF THE DRAWINGS

Implementations of the present technology will now be described, by way of embodiment, with reference to the attached figures.

DETAILED DESCRIPTION

Figure 1:
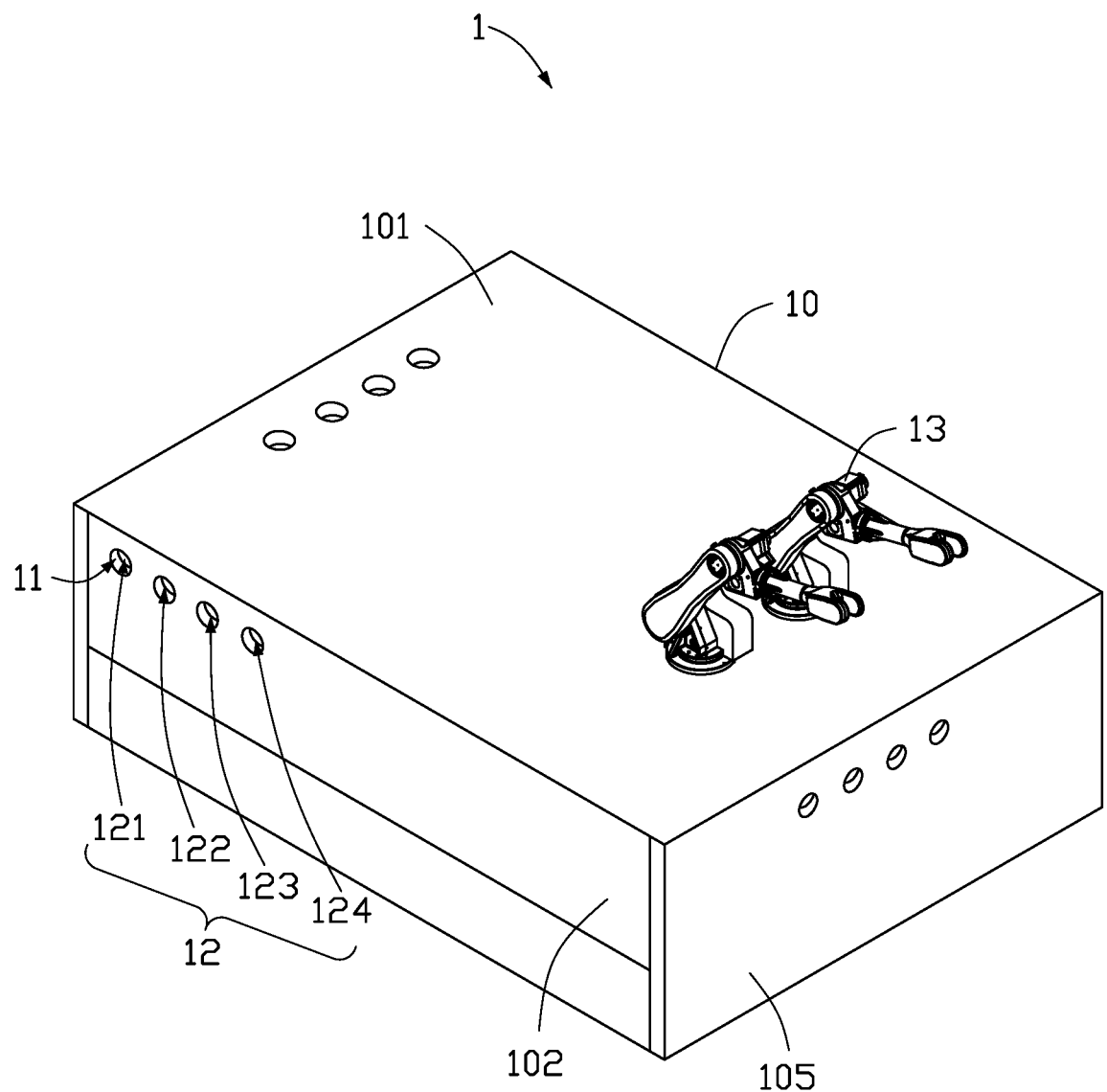
FIG. 1 is an isometric view of a first embodiment of an intelligent cleaning robot.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

First Embodiment

Figure 2:
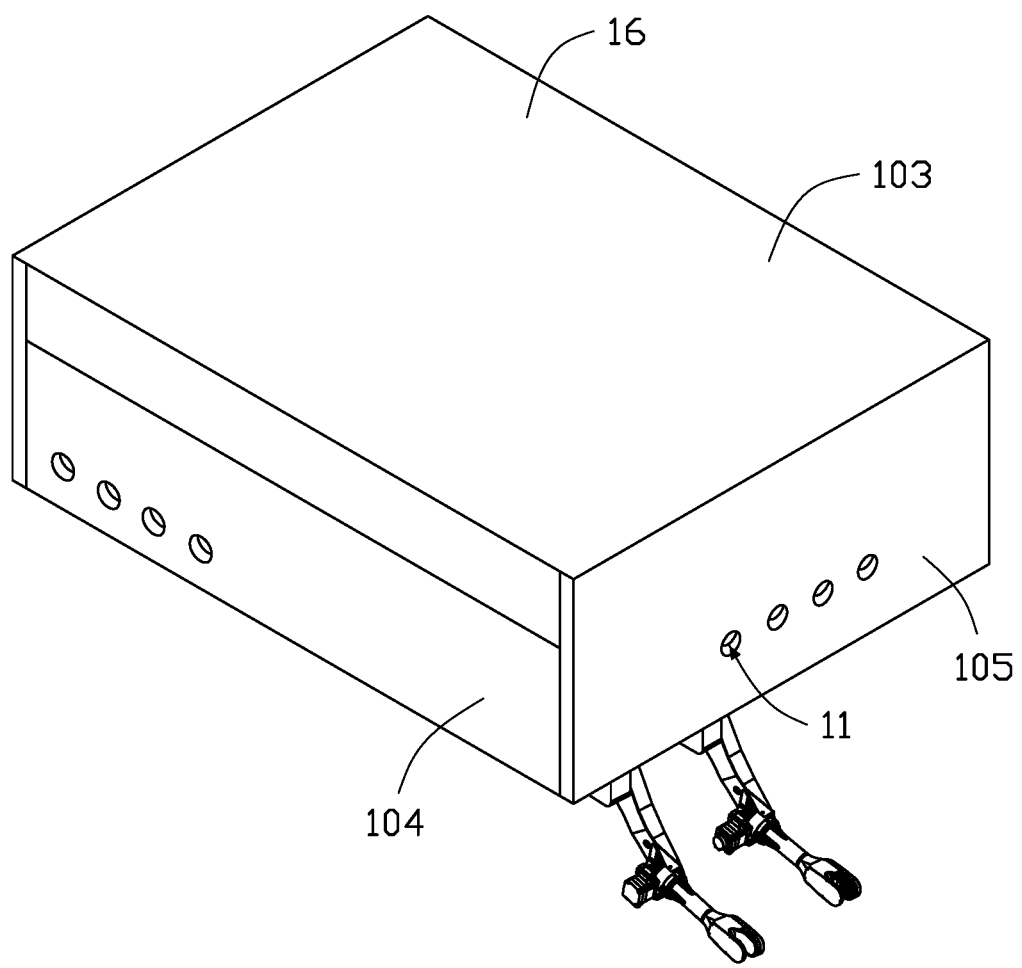
FIG. 2 is similar to FIG. 1, but viewed from another angle.
Figure 3:
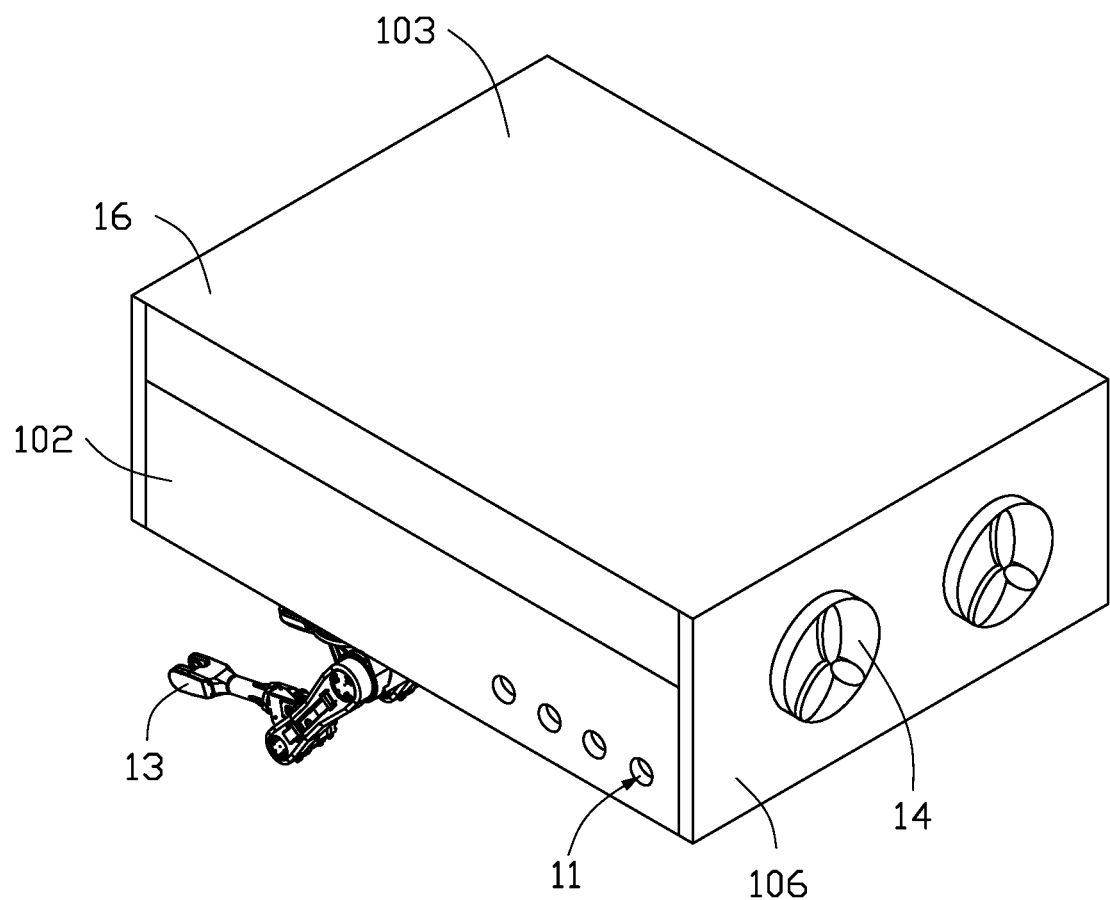
FIG. 3 is similar to FIG. 1, but viewed from another angle.
Figure 4:
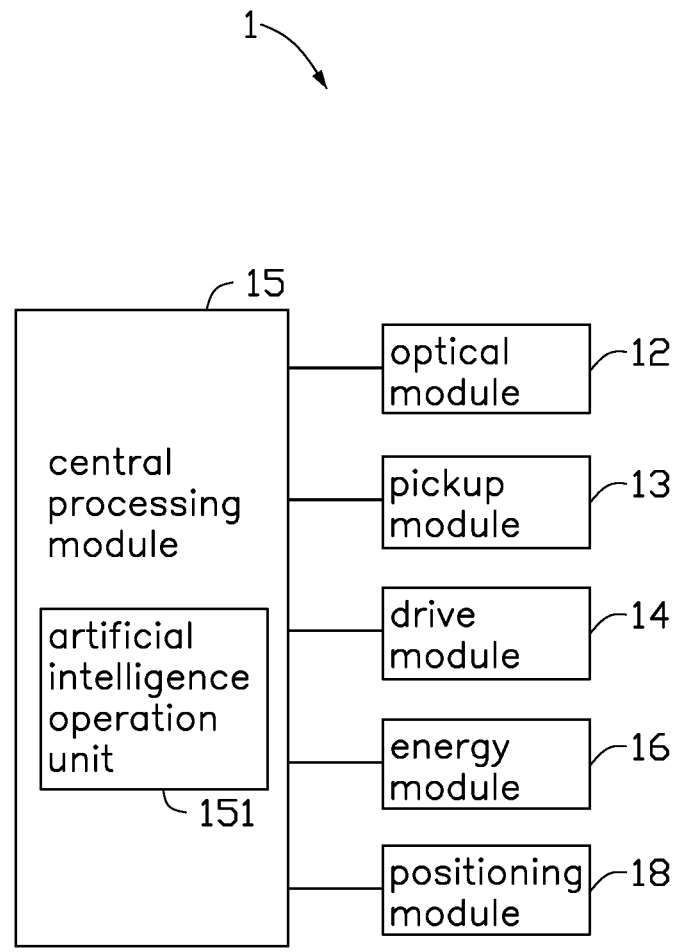
FIG. 4 is a block diagram of the intelligent cleaning robot of FIG. 1.

FIGS. 1-4 illustrate an intelligent cleaning robot (intelligent cleaning robot 1) which includes a housing 10, an optical module 12, a pickup module 13, a central processing module 15, and a drive module 14. The optical module 12 and the central processing module 15 are both arranged in the housing 10. The housing 10 includes a plurality of light transmission holes 11. The optical module 12 can emit light to an outside of the housing 10 through the light transmission holes 11 and receive light reflected back from a surrounding environment of the housing 10 through the light transmission holes 11. The optical module 12 includes an infrared light source 121, a structure light lens 122, a complex light source 124, and a color lens 123. The complex light source 124 can emit light of different wavelengths to the outside, and the color lens 123 can receive the reflected light and form a color image. The infrared light source 121 can emit infrared light, and the structure light lens 122 can receive the reflected infrared light and form a three-dimensional image. The central processing module 15 can receive the color image and the three-dimensional image and synthesize an image of an environment. The pickup module 13 and the drive module 14 are both arranged on an exterior of the housing 10 and communicate with the central processing module 15. The central processing module 15 can control the pickup module 13 to pick up foreign matter such as garbage from the surrounding environment of the housing 10 based on the image of an environment, and can control the drive module 14 to move the intelligent cleaning robot 1 in the surrounding environment based on the image of the environment.

In one embodiment, the pickup module 13 includes two mechanical arms which include a clamping portion, the pickup module 13 can be driven by the central processing module 15 to perform the picking up. In an alternative embodiment, the pickup module 13 can be a string bag, a pickup box, or a mechanical arm. In an alternative embodiment, the pickup module 13 can have a retractable structure or a structure which can be stored. When the storable pickup module 13 is in a non-working state, the pickup module 13 can be stored in the housing 10.

The intelligent cleaning robot 1 is submersible. The housing 10 is sealed and waterproof, and it can work normally in water depth with at least ten atmospheric pressures. The housing 10 can be substantially rectangular. In an alternative embodiment, the housing 10 can be other shapes according to actual needs, for example, the housing 10 can be spherical, ellipsoidal, triangular pyramid shaped, or drop shaped, without limit.

The housing 10 includes a first surface 101, a second surface 102, a third surface 103, a fourth surface 104, a fifth surface 105, and a sixth surface 106. The first surface 101, the second surface 102, the third surface 103, and the fourth surface 104 are connected to each other in the order stated. The fifth surface 105 connects to a first sides of the first surface 101, the second surface 102, the third surface 103, and the fourth surface 104. The sixth surface 106 connects to a second sides of the first surface 101, the second surface 102, the third surface 103, and the fourth surface 104, the sixth surface 106 being opposite to the fifth surface 105.

The housing 10 includes a plurality of light transmission holes 11. The light transmission holes 11 can be filled with organic and transparent matter, which allows light to pass through. The light transmission holes 11 allow light to pass through despite the waterproofing of the housing 10. In an alternative embodiment, the intelligent cleaning robot 1 includes a plurality of optical modules 12, and each of the optical modules 12 corresponds to at least four light transmission holes 11 in the plurality of light transmission holes. The optical modules 12 are arranged towards different directions, thus the intelligent cleaning robot 1 can perform detection along different directions simultaneously. The central processing module 15 can integrate signals collected by the optical modules 12.

In one embodiment, each of the first surface 101, the second surface 102, the fourth surface 104, and the fifth surface 105 defines four light transmission holes 11. Four light transmission holes 11 on one surface correspond to one infrared light source 121, one structure light lens 122, one complex light source 124, and one color lens 123 respectively. The infrared light source 121, the structure light lens 122, the complex light source 124, and the color lens 123 can function in relation to the environment through the light transmission holes 11.

The complex light source 124 can emit light of different wavelengths. The color lens 123 can receive the reflected light and form a color image. The color image includes color information and graphic information, the color information represents the colors of an environment, and the graphic information represents the shapes of obstacles or objects in the environment. The central processing module 15 can further process the color information and the graphic information. The central processing module 15 includes an artificial intelligence operation unit 151. The artificial intelligence operation unit 151 can process the color information and the graphic information and determine the environment and objects within it by combining data as to the environment in a database, which can help classify visible objects to determine specific information such as type of an object which may be picked up.

The infrared light source 121 can emit infrared light, and the structure light lens 122 can receive the reflected infrared light and form a three-dimensional image. The three-dimensional image includes morphology information. The central processing module 15 can further process the morphology information. The artificial intelligence operation unit 151 of the central processing module 15 can process the morphology information, determine distances between environmental obstacles and the intelligent cleaning robot 1 by combining databases, and obtain information of the objects and obstacles such as texture and surface material, which can help classify the object and help determine the material of the objects or obstacles.

The central processing module 15 can receive the color image and the three-dimensional image and synthesize an image of the environment. The artificial intelligence operation unit 151 can collect the image of the environment and classify and determine the obstacles and objects in the environment. The artificial intelligence operation unit 151 can learn according to the collected images of the environment, improving an effectiveness in various environments.

The intelligent cleaning robot 1 further includes a positioning module 18. The positioning module 18 is arranged in the housing 10 and configured to detect and record information as to an instant position of the intelligent cleaning robot 1.

The central processing module 15 can integrate the information as to a position of the intelligent cleaning robot 1 with the image of the environment and render information as to one position to correspond to one three-dimensional image and color image. The central processing module 15 can integrate the information as to a position with the image of the environment to obtain a model of the environment which includes information as to a plurality of positions and a plurality of images of the environment.

In one embodiment, the model of the environment is an environment map, and the image of the environment is an identified point within the environment map. The intelligent cleaning robot 1 can move according to the identified point in the environment map and perform cleaning at a first designated place. After garbage or other matter is cleaned up, the intelligent cleaning robot 1 can return to a second designated place for garbage disposal or unloading.

In one embodiment, the intelligent cleaning robot 1 can communicate with an external server, thus the information contained in the model of the environment can be sent to the external server, or a model of the environment can be downloaded from the external server.

The intelligent cleaning robot 1 further includes an energy module 16. The energy module 16 is arranged on the third surface 103 of the housing 10. The energy module 16 can includes a solar cell, a tidal energy converter, or a thermal energy converter. The central processing module 15 can control the working of the energy module 16, which can provide motive energy for the intelligent environment cleaning robot 1.

In one embodiment, the drive module 14 includes a propeller or other marine drive. The drive module 14 is arranged on the sixth surface 106. The central processing module 15 can control the drive module 14 to work, and the drive module 14 can drive the intelligent cleaning robot 1 to move in water.

Second Embodiment

Figure 5:
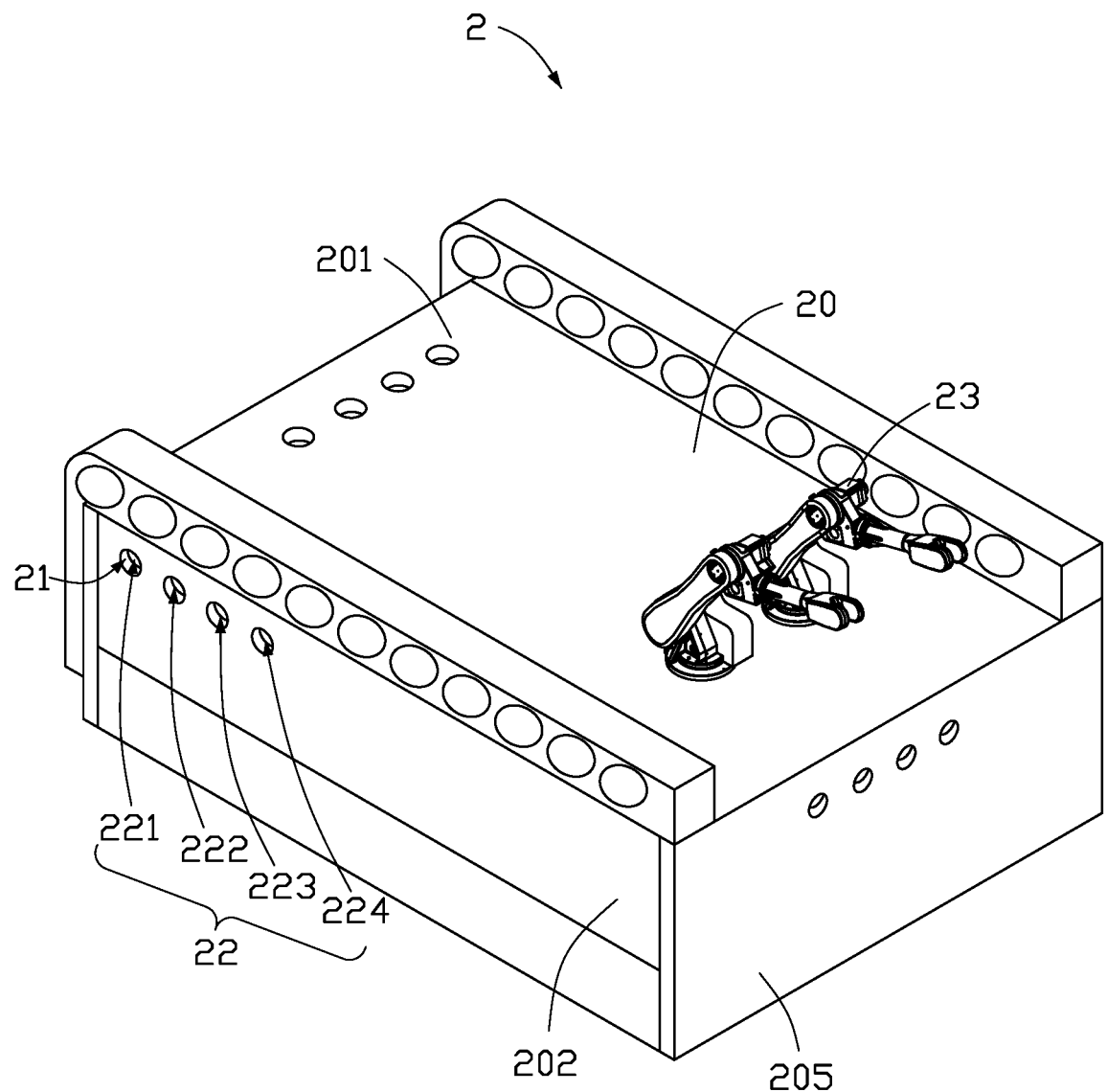
FIG. 5 is an isometric view of a second embodiment of an intelligent cleaning robot.
Figure 6:
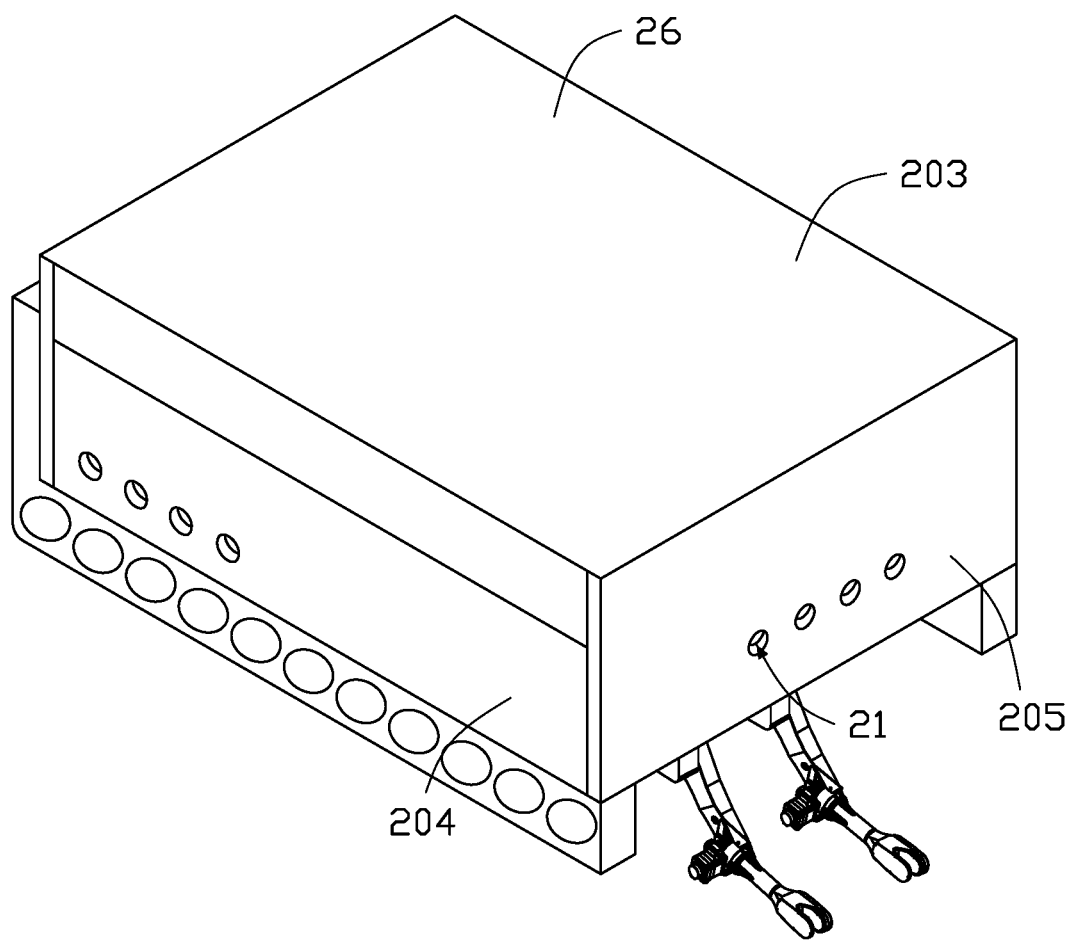
FIG. 6 is similar to FIG. 5, but viewed from another angle.
Figure 7:
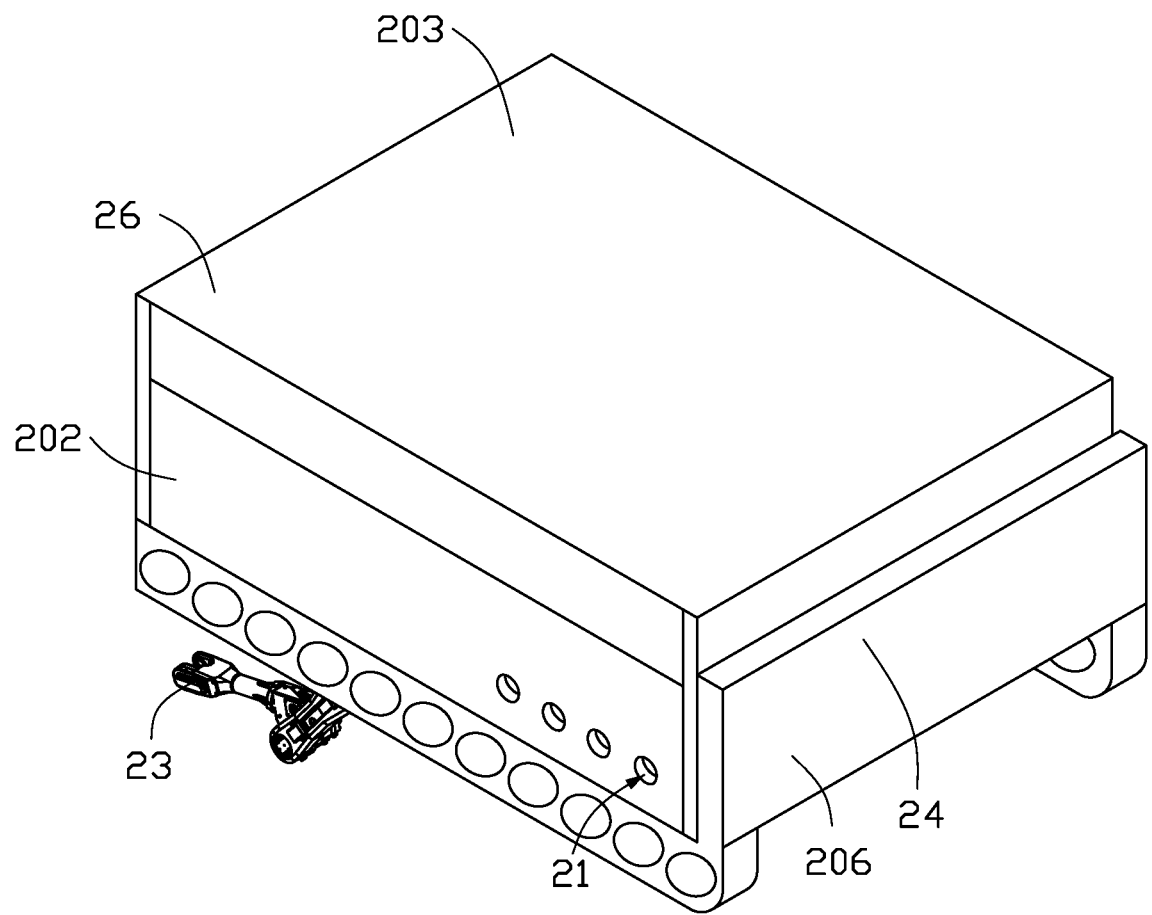
FIG. 7 is similar to FIG. 5, but viewed from another angle.
Figure 8:
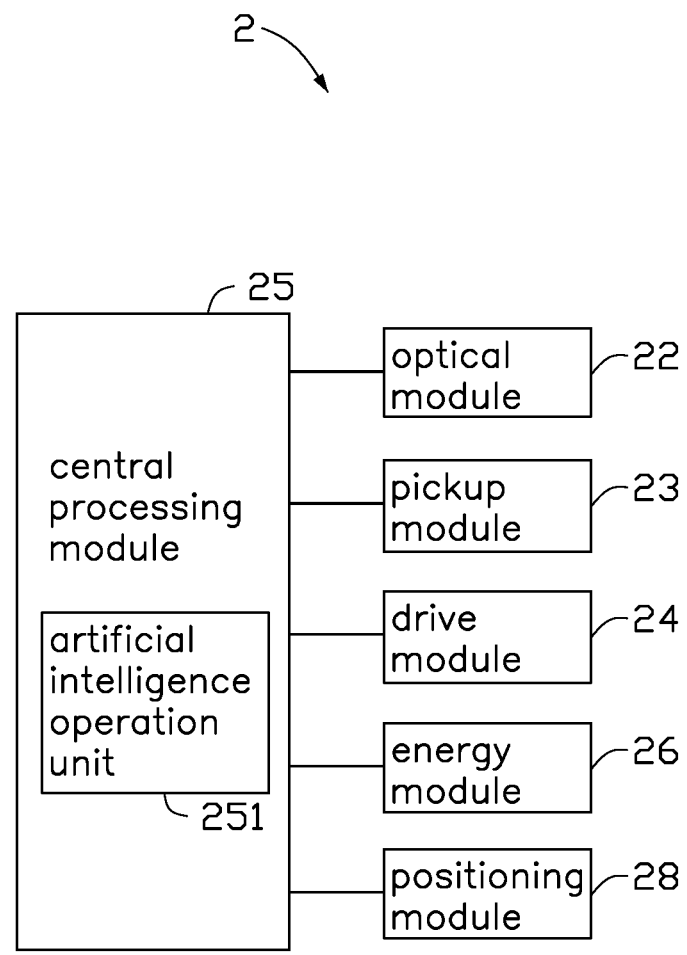
FIG. 8 is a block diagram of the intelligent cleaning robot of FIG. 5.

FIGS. 5-8 illustrate that an intelligent cleaning robot 2 includes a housing 20, an optical module 22, a pickup module 23, a central processing module 25, and a drive module 24. The optical module 22 and the central processing module 25 are both arranged in the housing 20. The housing 20 defines light transmission holes 21. The optical module 22 can emit light to an outside of the housing 20 through the light transmission holes 21 and receive light reflected back through the light transmission holes 21. The optical module 22 includes an infrared light source 222, a structure light lens 222, a complex light source 224, and a color lens 223. The complex light source 224 can emit light of different wavelengths to the outside, and the color lens 223 can receive the reflected light from the outside environment and form a color image. The infrared light source 222 can emit infrared light, and the structure light lens 222 can receive the reflected infrared light and form a three-dimensional image. The central processing module 25 can receive the color image and the three-dimensional image and synthesize an image of the environment. The pickup module 23 and the drive module 24 are both arranged on an outside of the housing 20 and communicate with the central processing module 25. The central processing module 25 can control the pickup module 23 to pick up foreign matter such as garbage, and control the drive module 24 to move the intelligent cleaning robot 2 based on the image of the environment.

In one embodiment, the pickup module 23 includes two mechanical arms which include a clamping portion, and the pickup module 23 can be driven by the central processing module 25 to perform picking up of garbage or object. In an alternative embodiment, the pickup module 23 can be a string bag, a pickup box, or a mechanical arm. In an alternative embodiment, the pickup module 23 can have a retractable structure or a structure which can be stored, thus when the pickup module 23 is in a non-working state, the pickup module 23 can be stored in the housing 20.

The housing 20 can be substantially rectangular. In an alternative embodiment, the housing 20 can be other nonlimited shape according to actual needs, for example, the housing 20 can be spherical, ellipsoidal, triangular, pyramid-shaped, or drop shaped.

The housing 20 includes a first surface 201, a second surface 202, a third surface 203, a fourth surface 204, a fifth surface 205, and a sixth surface 206. The first surface 201, the second surface 202, the third surface 203, and the fourth surface 204 are connected to each other in order stated. The fifth surface 205 connects to a first sides of the first surface 201, the second surface 202, the third surface 203, and the fourth surface 204. The sixth surface 206 connects to a second sides of the first surface 201, the second surface 202, the third surface 203, and the fourth surface 204, the sixth surface 206 being opposite to the fifth surface 205.

The housing 20 defines a plurality of light transmission holes 21. The light transmission holes 21 can be filled with organic and transparent matter, which allows light to pass through. The light transmission holes 21 can allow light to pass through without breaking the sealings of the housing 20. In an alternative embodiment, the intelligent cleaning robot 2 includes a plurality of optical modules 22, there are at least four light transmission holes 21 corresponding to the optical module 22. The optical modules 22 are arranged towards different directions, thus the intelligent cleaning robot 2 can perform detection along different directions simultaneously. The central processing module 25 can integrate signals collected by the optical modules 22.

In one embodiment, each of the first surface 201, the second surface 202, the fourth surface 204, and the fifth surface 205 defines four light transmission holes 21. Four light transmission holes 21 on one surface correspond to one infrared light source 222, one structure light lens 222, one complex light source 224, and one color lens 223 respectively, thus the infrared light source 222, the structure light lens 222, the complex light source 224, and the color lens 223 can carry out their respective functions through the light transmission holes 21.

The complex light source 224 can emit light of different wavelengths. The color lens 223 can receive the reflected light and form a color image. The color image includes color information and graphic information, the color information represents the colors of an external environment, and the graphic information represents the shapes of obstacles and objects in the external environment. The central processing module 25 can further process the color information and the graphic information. The central processing module 25 includes an artificial intelligence operation unit 251. The artificial intelligence operation unit 251 of the central processing module 25 can process the color information and the graphic information and can make determinations as to environments by combining data as to the environment in a database, which can help classify objects and matter viewed to determine specific information such as type of an object which may be picked up.

The infrared light source 222 can emit infrared light, and the structure light lens 222 can receive the reflected infrared light and form a three-dimensional image. The three-dimensional image includes morphology information. The central processing module 25 can further process the morphology information, the artificial intelligence operation unit 251 of the central processing module 25 can process the morphology information, determine distances between environmental objects and obstacles and the intelligent cleaning robot 2 by combining databases, and obtain information of objects and obstacles such as texture and surface material, which can help classify the object and help determine the material of the objects or obstacles.

The central processing module 25 can receive the color image and the three-dimensional image and synthesize an image of the environment. The artificial intelligence operation unit 251 can collect the image of the environment and classify and determine the obstacles and objects which are visible in the environment. The artificial intelligence operation unit 251 can learn according to the collected images of the environment, improving an effectiveness in various environments.

The intelligent cleaning robot 2 further includes a positioning module 28. The positioning module 28 is arranged in the housing 20 and configured to detect and record information as to instant position of the intelligent cleaning robot 2. The central processing module 25 can integrate the information as to a position of the intelligent cleaning robot 2 with the image of the environment to render a correspondence between information as to one position, one three-dimensional image, and one color image.

The central processing module 25 can integrate the information as to a position with the image of the environment to obtain a model of the environment which includes information as to a plurality of positions and a plurality of images of the environment. In one embodiment, the model of the environment is an environment map, the image of the environment is an identified point within the environment map. The intelligent cleaning robot 2 can move in the environment map and perform cleaning at a first place designated according to the identified point. After garbage or other matter is cleaned up, the intelligent cleaning robot 2 can return to a second designated place for garbage disposal or unloading.

In one embodiment, the intelligent cleaning robot 2 can communicate with an external server, and thus can send the information contained in the model of the environment to the external server, or download a model of the environment from the external server.

The intelligent cleaning robot 2 further includes an energy module 26. The energy module 26 is arranged on the third surface 203 of the housing 20. The energy module 26 can includes a solar cell, a tidal energy converter, or a thermal energy converter. The central processing module 25 can control the working of the energy module 26, which can provide motive power for the intelligent environment cleaning robot 2.

In one embodiment, the drive module 24 includes at least two groups of caterpillar tracks around wheels. The drive module 24 is arranged on the sixth surface 206. The central processing module 25 can control the drive module 24 to work, and the drive module 24 can drive the intelligent cleaning robot 2 to move on land or on road under water.

In an alternative embodiment, the drive module 24 of the intelligent cleaning robot 2 can include wheels for moving on a suitable surface and propellers for driving in a water environment, thus the intelligent cleaning robot 2 can have amphibious working capability.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:
1. An intelligent cleaning robot comprising:
 a housing comprising a plurality of light transmission holes;

an optical module arranged in the housing and configured to emit and receive light through the plurality of light transmission holes, the optical module comprising:
an infrared light source configured to emit infrared light to an outside of the housing,
a structure light lens configured to receive infrared light reflected from a surrounding environment of the housing and form a three-dimensional image,
a complex light source configured to emit light of different wavelengths to the outside of the housing, and
a color lens configured to receive light reflected from the surrounding environment of the housing and form a color image;
a central processing module arranged in the housing;
a pickup module arranged on an exterior of the housing and communicating with the central processing module; and
a drive module arranged on the exterior of the housing and communicating with the central processing module;
wherein the central processing module is configured to receive the three-dimensional image and the color image to synthesize an environment image, control the pickup module to pick up based on the environment image and control the drive module to move the intelligent cleaning robot based on the environment image.

2. The intelligent cleaning robot of claim 1, wherein the intelligent cleaning robot further comprises an energy module arranged on a surface of the housing, the energy module comprises a solar cell and is configured to provide power for the intelligent environment cleaning robot.

3. The intelligent cleaning robot of claim 1, wherein the central processing module comprises an artificial intelligence operation unit which is configured to synthesize the three-dimensional image and the color image to obtain the environment image.

4. The intelligent cleaning robot of claim 3, wherein the three-dimensional image comprises graphic information, the color image comprises color information, and the artificial intelligence operation unit is configured to process the graphic information and the color information to determine material of an object in the surrounding environment.

5. The intelligent cleaning robot of claim 4, wherein the intelligent cleaning robot further comprises a positioning module, the positioning module is arranged in the housing and configured to detect and record information of an instant position of the intelligent cleaning robot.

6. The intelligent cleaning robot of claim 5, wherein the central processing module is further configured to integrate the environment image and the information of an instant position of the intelligent cleaning robot and make information of one instant position of the intelligent cleaning robot correspond to one three-dimensional image and one color image.

7. The intelligent cleaning robot of claim 6, wherein the central processing module is further configured to integrate a plurality of environment images and information of a plurality of instant positions of the intelligent cleaning robot to thereby obtain a model of the surrounding environment.

8. The intelligent cleaning robot of claim 1, wherein the drive module comprises a plurality of propellers, the housing is sealed, the pickup module and the drive module are arranged on different sides of the housing.

9. The intelligent cleaning robot of claim 1, wherein the drive module comprises a plurality of drive wheels which are arranged on at least one side of the housing.

10. The intelligent cleaning robot of claim 1, wherein the intelligent cleaning robot comprises a plurality of optical modules, each of the plurality of optical modules corresponds to at least four light transmission holes.

* * * * *